Patented May 31, 1949

2,472,055

UNITED STATES PATENT OFFICE 2,472,055

RUBBERLIKE ARTICLES AND METHOD OF MAKING SAME

George H. McFadden and John F. Lyman, Columbus, Ohio, and Amos G. Horney, Merrifield, Va., assignors to The Ohio State University Research Foundation, Columbus, Ohio, a corporation of Ohio No Drawing. Application October 2, 1948, Serial No. 52,588

15 Claims. (Cl. 260—723)

This is a continuation-in-part of application, Serial No. 683,766, filed July 15, 1946, now abandoned.

This invention is concerned with improvements in the manufacture of articles from aqueous dispersions of rubber and rubber-like materials, which dispersions are capable of being gelled or coagulated under controlled and selected coagulating conditions. The gelation is made possible through the use of a gelling agent or coagulant which consists of a salt of fluozirconic acid, a preferred embodiment being the ammonium salt thereof. In this connection, other selected salts of fluozirconic acid including an alkali or alkaline earth metal are suitable.

It is therefore the primary object of the invention to provide a composition of matter comprising an aqueous dispersion of a rubber-like material which includes a salt of fluozirconic acid therein, the action of said salt being that of a coagulant which acts under selected and controlled conditions to provide a delayed coagulating action.

Another object of the invention is to provide a method for gelling and/or coagulating aqueous dispersions of rubber-like materials through the use of controlled quantities of fluozirconates.

A still further object of the invention is to provide a method for manufacturing articles from an aqueous dispersion of a rubber-like material, which method includes the step of reacting the dispersion with a salt of fluozirconic acid for causing the dispersion to gel within a predetermined period of time.

Another object of the invention is to provide a gelling agent for causing coagulation under delayed conditions of rubber-like dispersions, said gelling agent consisting of a salt of fluozirconic acid.

In carrying out the above object, it is a further object to utilize the ammonium salt of fluozirconic acid.

Further objects and advantages of the present invention will be apparent from the following description.

The use of latices and aqueous dispersions of rubber-like materials to form molded articles is particularly desirable where the dispersion, in liquid form, may be gelled or coagulated under controlled conditions after being filled into a mold. This procedure eliminates many previously necessary steps of manufacture and further provides a completely filled mold, thus decreasing the number of rejects usually present in molding processes. Similarly, flash may be substantially eliminated and the entire manufacturing procedure may be simplified. In this connection, the identity of a satisfactory coagulant which acts in a delayed manner has always been an obstacle to the satisfactory use of latices or aqueous dispersions of rubber as mold filling materials. For this purpose, it is desirable to have a coagulant or gelling agent which may be mixed with the dispersion and which has no action thereupon for a predetermined period of time after which the dispersion becomes coagulated through the delayed action of said coagulant. This procedure may be utilized in the manufacture of articles from sponge rubber compounds wherein the dispersed rubber is compounded in liquid form and includes blowing agents, etc., or it may be used with compounded latex, etc. Also sponge rubber may be formed from frothed or foamed dispersions of latex wherein the delayed coagulant is present and causes the gelation of the latex in the mold and thereby occludes the air that has previously been beaten therein. Instead of molding, the product may be dipped or sprayed or any other use may be made of the dispersion wherein gelation is desirable after a predetermined time delay. In all instances therefore, the success of the process depends entirely upon the use of a satisfactory gelling agent or coagulant which will act in a delayed manner and which may be closely controlled in its action.

For this purpose, we have found that the salts of fluozirconic acid are particularly desirable and act in a delayed manner to coagulate latices and dispersions of rubber-like materials, which delay may be controlled by the temperature of the dispersion to be coagulated, the pH of the dispersion, the percentage of solids therein, the quantity of coagulant used, together with the quantity of catalyst that may be used when such a compound is added. All of these variable factors may be controlled for adjusting and regulating the period of time required for gelation and will be discussed in more detail hereinafter.

In the preferred embodiment, we utilize ammonium fluozirconate which for all practical purposes has a formula $(NH_4)_2ZrF_6$, this formula being taken as the probable formula for a fluozirconic acid salt made under conditions set forth in the literature. Other salts of fluozirconic acid, such as, potassium, sodium, zinc, calcium, or for that matter, any soluble or partially soluble salt of any alkali or alkaline earth metal which may be suitably controlled in the process will be satisfactory.

A table setting forth time of gelation using different quantities of ammonium fluozirconate under varying conditions is as follows:

| Concentration of ammonium Fluozirconate in grams per 100 cc. latex | Temperature, °C. | Time | Latex |
|---|---|---|---|
| 1 | 18.5 | 10 min | neoprene. |
| 1 | 18.5 | 12 min | Do. |
| 0.75 | 18.5 | 34 min | Do. |
| 0.5 | 18.5 | 42 hrs | Do. |
| 0.25 | 18.5 | 72 hrs | Do. |
| 1 | 25 | 4 min | Do. |
| 1 (with 5% ZnO) | 25 | 2.5 min | Do. |
| 1 | 30 | 3.5 min | Do. |
| 1 | 40 | 2.5 min | Do. |
| 1 | 50 | 15 min | natural. |
| 2 (with 5% ZnO) | 30 | 10 min | GRS 60% Solid. |

Type 60 neoprene latex used (58-60% solids).

In all cases, the ammonium fluozirconate was in a bentonite suspension. It is obvious from these results that latices and dispersions of all types of rubber-like materials may be satisfactorily gelled, for example, latices of natural rubber, butadiene-styrene copolymers, butadiene-acrylonitrile copolymers, polychloroprene, aqueous dispersions of reclaimed rubber, coagulated latex or vulcanized rubber, etc., or any other satisfactory latex or aqueous rubber-like dispersion or mixture thereof may be coagulated in this manner. Other synthetic rubber latices may be used and these may be any latex selected from the class prepared by the polymerization in aqueous emulsion of a butadiene-1,3 hydrocarbon such as butadiene-1,3, isoprene, 2,3-dimethyl butadiene-1,3, piperylene or the like, either alone or in admixture with each other and/or in admixture with lesser or equal amounts of one or more mono-ethylenic compounds copolymerizable therewith in aqueous emulsion such as acrylonitrile, methacrylonitrile, alpha-chloro acrylonitrile and similar acrylic nitriles; styrene, vinyl naphthalene, p-chlorostyrene and similar aryl olefins and substituted aryl olefins; methyl acrylate, methyl methacrylate, acrylamide and similar esters and amides of acrylic acids; methyl isopropenyl ketone, vinylidene chloride, isobutylene, methyl vinyl ether, and other compounds containing a single ethylenic double bond, $>C=C<$, which are copolymerizable with butadiene-1,3 hydrocarbons in aqueous emulsion. In fact, any of the compounds which may be termed butalastics as defined in the book "Butalastic polymers, a treatise on synthetic rubbers," by Marchionna may be used with success.

The control of the pH of the aqueous dispersion is one factor that determines the quantity of the gelling agent required to cause coagulation in a definite time. In this case, the pH of the latex is normally above 10 and need not be controlled if sufficient gelling agent is added. However, by adjusting the pH of the dispersion, less gelling agent is required, thereby performing a more economical operation. We prefer to adjust the pH to about 9.3 for economical results which may be accomplished by the use of commercial buffer solutions. It will be noted that no heating is required to cause gelation although as the temperature of the dispersion is raised, the time required for gelation with the same quantity of gelling agent is reduced, therefore, an economic balance should be obtained between the cost of gelling agent and cost of heating the solution for most satisfactory results.

It is understood that bentonite is used as a dispersing agent for the fluozirconic acid salt whereby the salt is maintained in suspension in water solution. Other dispersing materials such as dispersing gums may be used for this purpose as well known in the art.

The gelling agent and bentonite may be added directly to the latex, or aqueous dispersion, in the form of a fine powder and mixed therewith or may be made up in a separate suspension wherein the dispersing agent and gelling agent are mixed in water prior to addition to the aqueous dispersion of the rubber-like material. All of these variations come within the scope of our invention. Obviously, when the coagulant or gelling agent is in a slurry form with the bentonite, it may be added in a more facile manner and generally produces a better mixture with the aqueous dispersion. However, either type of addition, if properly accomplished, will produce a satisfactory result.

The use of zinc oxide, or other catalytic materials may often be desirable if a speed-up in gelling time is desirable at any given temperature. In this connection, the zinc oxide may be added in a slurry or as a powder. We have found that for most commercial purposes, from 1 to 5% zinc oxide yields satisfactory results.

The percentage of solids in the latex or aqueous dispersion is also a matter of importance from the control standpoint. The solids in the aqueous dispersion may vary from 25% up to 76% with a preferred range of between 45 to 65%. The variation in percentage of solids will vary the time of gelation and will require adjustment of the quantity of gelling agent used, the temperature, the use of catalysts, etc., any one or more of these variables being capable of changing the time for gelation. Also, as previously stated, the pH of the aqueous dispersion is also a controlling factor.

The gel or coagulant obtained through the use of the gelling agents disclosed herein is smooth and jelly-like and is free from clots or lumps which distinguishes it very definitely from curdled latex and the like. For practical purposes, the gelling agent preferably varies between 0.25 to 2% but it is understood that this range is not limiting except for economic reasons.

While the embodiments of the present invention as herein disclosed, constitute preferred forms, it is to be understood that other forms might be adopted.

What is claimed is as follows:

1. In the manufacture of articles from aqueous dispersions of rubber-like materials, taken from the class consisting of: natural rubbers, butadiene-acrylonitrile copolymers, butadiene-styrene copolymers and polychloroprene, the step of reacting an alkaline dispersion of rubber-like material with suitable small quantities of a soluble material taken from the class consisting of the alkali and alkaline earth metal salts of fluozirconic acid, the quantity of said salt controlling the degree and speed of gelling of said dispersion.

2. In the manufacture of articles from aqueous dispersions of rubber-like materials, taken from the class consisting of: natural rubbers, butadiene-acrylonitrile copolymers, butadiene-styrene copolymers and polychloroprene, the step of reacting an alkaline dispersion of rubber-like material with suitable small quantities of a soluble material taken from the class consisting of the alkali and alkaline earth metal fluozirconate, the quantity of said salt controlling the degree and speed of gelling of said dispersion.

3. A new composition of matter for use in the production of rubber goods, comprising: latex having admixed therewith suitable small quantities of a soluble material taken from the class consisting of alkali and alkaline earth metal salts of fluozirconic acid in a quantity sufficient to cause a delayed gelling of said latex.

4. A new composition of matter for use in the production of rubber goods, comprising: latex having admixed therewith ammonium fluozirconate in quantities of from 0.25% to 2%.

5. A method of gelling latex, which comprises: adding to an already alkaline latex a soluble salt of fluozirconic acid taken from the class consisting of alkali and alkaline earth metal salts, and suitable small quantities sufficient to cause gelation after a desired time delay.

6. A method of gelling latex, which comprises: adding to an already alkaline latex, ammonium fluozirconate in suitable small quantities sufficient to cause gelation after a desired time delay.

7. In the manufacture of sponge rubber articles, the steps comprising: aerating latex, mixing suitable compounding ingredients into said aerated latex, and finally controlling the time for gelation of said aerated and compounded latex by the addition thereto of a predetermined small quantity of a delayed coagulant, selected from the class of fluozirconates consisting of: the soluble and partially soluble salts of alkali and alkaline earth metals.

8. In the manufacture of sponge rubber articles, the steps comprising: aerating latex, mixing suitable compounding ingredients into said aerated latex, and finally controlling the time for gelation of said aerated and compounded latex by the addition thereto of a predetermined small quantity of a delayed coagulant, consisting of ammonium fluozirconate.

9. A new composition of matter for use in the production of sponge rubber articles comprising: a foamed and compounded latex having admixed therewith a predetermined small quantity of a delayed coagulant selected from the class of fluozirconates, consisting of the soluble and partially soluble salts of the alkali and alkaline earth metals.

10. A new composition of matter for use in the production of sponge rubber articles comprising: a foamed and compounded latex having admixed therewith a predetermined small quantity of a delayed coagulant consisting of ammonium fluozirconate.

11. A new composition of matter for use in the production of rubber goods, comprising: latex having admixed therewith potassium fluozirconate in quantities of from 0.25% to 2%.

12. In the manufacture of sponge rubber articles, the steps comprising: aerating latex, mixing suitable compounding ingredients into said aerated latex, and finally controlling the time for gelation of said aerated and compounded latex by the addition thereto of a predetermined small quantity of a delayed coagulant consisting of potassium fluozirconate.

13. A new composition of matter for use in the production of sponge rubber articles comprising a foamed and compounded latex having admixed therewith a predetermined small quantity of delayed coagulant, consisting of potassium fluozirconate.

14. In the manufacture of articles from aqueous dispersions of rubber-like materials, taken from the class consisting of: natural rubbers, polychloroprene and butalastic polymers including a single ethylenic double bond >C=C< which are copolymerizable with butadiene-1,3 hydrocarbons in aqueous emulsion, the step of reacting an alkaline dispersion of rubber-like material with suitable small quantities of a soluble material taken from the class consisting of the alkali and alkaline earth metal fluozirconate, the quantity of said salt controlling the degree and speed of gelling of said dispersion.

15. In the manufacture of articles from aqueous dispersions of rubber-like materials taken from the class consisting of: natural rubbers, polychloroprene and butalastic polymers including a single ethylenic double bond >C=C< which are copolymerizable with butadiene-1,3 hydrocarbons in aqueous emulsion, the step of reacting an alkaline dispersion of rubber-like material with suitable small quantities of a soluble material taken from the class consisting of the alkali and alkaline earth metal salts of fluozirconate acid, the quantity of said salt controlling the degree and speed of gelling of said dispersion.

GEORGE H. McFADDEN.
JOHN F. LYMAN.
AMOS G. HORNEY.

No references cited.